United States Patent Office 3,211,630
Patented Oct. 12, 1965

3,211,630
PROCESS FOR PURIFICATION OF
NITROMETHANE
John B. Tindall, Terre Haute, Ind., assignor to Commercial Solvents Corporation, a corporation of Maryland
No Drawing. Filed May 28, 1964, Ser. No. 371,085
13 Claims. (Cl. 202—42)

The present invention relates to a process for the recovery of nitromethane in admixture with higher nitroalkanes.

Nitromethane in admixture with higher nitroalkanes can be produced by the nitration of higher paraffin hydrocarbons. For example, a mixture of nitromethane, nitroethane, 1-nitropropane and 2-nitropropane is obtained from the nitration of propane with suitable nitrating agents. When nitromethane of relatively high purity, e.g. greater than 96 percent, is desired, the higher nitroalkanes are considered as impurities. These impurities or contaminants present a separation problem, and up to the present time, the production or recovery of pure nitromethane has proved too troublesome and too expensive for most commercial practices. Commercial nitromethane, for example, is typically about 94 to 97% purity after fractionation of the various nitroalkanes produced in the nitration of propane. The reaction mixture generally contains from about 5 to 20 percent by weight nitromethane.

A process has now been surprisingly discovered, however, whereby nitromethane having a purity of above about 97% and advantageously above about 99%, e.g. 99.8%, may be easily recovered, in a highly efficient manner, from crude nitromethane mixtures including, for example, commercial nitromethane. This process is advantageously employed for the recovery of nitromethane from its admixture with higher nitroalkanes having from about 2 to 30 carbon atoms, particularly those having from about 2 to 6 or 15 carbon atoms, e.g. nitroethane, 1-nitropropane, 2-nitropropane, 2-nitrodecane, nitrocetane, and the like, alone or in mixtures, and regardless of whether the nitroalkane is a primary, secondary or tertiary nitroalkane. Such contaminants will generally be present in commercial nitromethane in amounts within the range of about 3 to 6 weight percent; however, the present invention may be used to purify nitromethane in admixture with such contaminants in the range of from about 0.01 to 25 or more weight percent.

The process of the present invention generally comprises adding water and an alkane to the crude nitromethane containing the contaminants, heating the mixture to distill off a purified mixture consisting essentially of nitromethane, water and alkane which condenses into a three-layer distillate, and separating the lowermost layer which contains the nitromethane and small amounts, e.g. about 3 to 6 wt. percent, of water and alkane. The higher nitroalkane impurities remain as residue in the boiler of the distillation means. The nitromethane separated may be distilled to increase the purity by substantially removing the water and alkane.

Alkanes which may be used in the instant invention include alkanes and cycloalkanes having from about 6 to 8, preferably six, carbon atoms. Such alkanes include n-hexane; cyclohexane; 2-methyl-pentane, 3-methyl-pentane; 2,2-dimethyl-butane; 2,3-dimethyl-butane; heptane; isooctane, and the like. Hexane and cyclohexane, which can provide nitromethane having a purity greater than 99.5% and 99.1%, respectively, are preferred.

The alkane and water can be added to the crude nitromethane containing higher nitroalkanes in amounts sufficient to form an azeotropic mixture with the nitromethane. Generally such amounts of alkane are within the weight ratio of alkane to nitromethane of from about 0.1 to 15:1 or more, with no practical advantage being present in using a greater amount. Such amounts of water are generally in a weight ratio of water to nitromethane of from about 0.1 to 1:1. Additional water may be used although there is no practical advantage in using a ratio greater than about 1:1.

Distillation of the mixture of crude nitromethane, water and alkane is advantageously accomplished by heating the mixture e.g. in a fractionating column under atmospheric pressure at a temperature sufficient to provide a distillate. Generally the temperatures depend upon the particular alkane used and will range from about 50 to 85° C., usually from about 55 to 65° C. when hexane or cyclohexane is used as the alkane. The lowermost layer of the three-layer distillate may be separated by conventional means, e.g. by decanting, and the water and alkane recycled. Further distillation of the lowermost layer to remove alkane and water may be accomplished by heating at atmospheric pressure almost to the boiling point of nitromethane (101.5° C., 765 mm.), e.g. to from about 95 to 101.5° C. to recover substantially pure nitromethane as a residue. The nitromethane product obtained after such further distillation generally has a purity of over 99%.

The following examples will serve to further illustrate the present invention.

Example I

A mixture of 513 gms. nitromethane containing 96.5% nitromethane, 1.2% nitromethane, 2.1% 2-nitropropane and 0.1% 1-nitropropane (hereinafter in these examples referred to as "commercial grade nitromethane") 68 gms. hexane (95 mole percent) and 104 gms. water was distilled through a 56" column. The mixture boiled at 58° C. and three layers came off.

The lowermost layer containing nitromethane was decanted. This layer weighed 509 gms.

507 grams of the 509 gms. of the nitromethane-containing layer were distilled through a ¾ x 24" column to 100.5° C. The material which passed over included (a) an upper layer, 12.6 gms.; (b) middle layer, 6.4 gms.; and (c) a lower layer, 33.0 gms. Approximately 448 gms. of residue, the nitromethane, remained. Gas chromatograph analysis indicated: nitromethane, 99.9% avg. (area percent), and nitroethane, 0.1% avg.

Example II 550 grams of commercial plant grade nitromethane were added to the water and hexane remaining after the initial distillation in Example I and the distallation was continued. Fresh water and hexane, to replace that remaining in the nitromethane layer, were also added. The mixture boiled at 59° C. and three layers came off. An analysis of the residue remaining after this distallation showed that essentially all of the nitromethane had been removed, thus demonstrating the excellent efficiency of the present process for separating nitromethane from higher nitroalkanes.

The lowermost layer containing nitromethane and weighing 544 gms. was decanted, and was heated to 100.5° C. to distill off water and alkane. The material which distilled off condensed into (a) an upper layer, 10 gms.; (b) a middle layer, 11 gms.; and (c) a lower layer, 43 gms. The residue, weighing 78 gms. analyzed: nitromethane, 99.8%; nitroethane, 0.2%; and acetonitrile, trace.

Example III

A mixture of 525 gms. commercial grade nitromethane, 139 gms. cyclohexane and 165 gms. water were distilled through a ¾ x 56" column and decanter. Most of the lowermost layer came off at 63.5 to 64° C. After about 7 hours, the temperature rapidly increased to 67.5° and the lowermost layer practically stopped separating. This layer was removed while the middle and upper layers were returned to the column.

The weight of lowermost layer containing essentially nitromethane and small amounts of water and cyclohexane was 533 gms.

532 grams of this layer were distilled through a ¾ x 24" column at a temperature up to 100.5° C. The lowermost layer of the condensed distillate was returned to the column occasionally. The following sequence was noted in this distillation to 100.5° C.: lowermost layer, 7.9 gms.; middle layer, 11.1 gms.; upper layer, 18.9 gms. The residue weighed 486 gms. and its analysis showed nitromethane, 99.1%; nitroethane, 0.8%; 2-nitropropane, trace; and acetone, trace.

*Example IV*

The purification of nitromethane is accomplished according to the procedure of Example III substituting heptane for the cyclohexane.

*Example V*

The purification of nitromethane is accomplished according to the procedure of Example III substituting iso-octane for the cyclohexane.

It is claimed:
1. A process for the purification of nitromethane in admixture with higher nitroalkanes comprising adding water and an alkane containing from 6 to 8 carbon atoms to said nitromethane mixture in an amount sufficient to form an azeotropic mixture with said nitromethane, heating the mixture to produce an azeotrope containing nitromethane, water and alkane, condensing the azeotrope to produce a nitromethane condensate, and recovering the nitromethane.

2. The process of claim 1 wherein said alkane is an aliphatic alkane having 6 carbon atoms.

3. The process of claim 1 wherein said alkane is a cycloalkane having 6 carbon atoms.

4. The process of claim 1 wherein said water is added in a weight ratio of water to nitromethane of from about 0.1 to 1:1 and said alkane is added in a weight ratio of alkane to nitromethane of from about 0.1 to 15:1.

5. The process of claim 4 wherein the alkane is selected from the group consisting of hexane and cyclohexane.

6. The process of claim 5 wherein said distillation comprises heating said mixture in a fractionation column under atmospheric pressure at a temperature of from about 55° C. to about 85° C.

7. The process of claim 6 wherein the condensate is in three layers and the lowermost layer containing the nitromethane is decanted to recover nitromethane.

8. The process of claim 7 wherein said lowermost layer contains nitromethane, alkane and water and it is further distilled at a temperature up to about 101.5° C. to distill off alkane and water to further purify the nitromethane.

9. A process for the recovery of substantially pure nitromethane from its admixture with higher nitroalkanes comprising adding water and an alkane containing from about 6 to 8 carbon atoms to said nitromethane mixture in amounts sufficient to form an azeotropic mixture with said nitromethane, heating the resulting mixture to distill off an azeotropic mixture of nitromethane, water and alkane, condensing the mixture to obtain a three-phase distillate, separating the lowermost layer containing nitromethane, water, and alkane and heating the layer to distill off said water and alkane to produce substantially pure nitromethane.

10. The process of claim 9 wherein the resulting mixture of nitromethane, higher nitroalkanes, alkane and water is distilled under atmospheric pressure at a temperature of from about 55° C. to about 85° C.

11. The process of claim 10 wherein said water is added in a weight ratio of water to nitromethane of from about 0.1 to 1:1.

12. The process of claim 11 wherein said alkane is added in a weight ratio of alkane to nitromethane of from about 0.1 to 15:1.

13. The process of claim 9 wherein the alkane and water remaining after separation of the lowermost layer containing nitromethane are recycled.

No references cited.

CARL D. QUARFORTH, *Primary Examiner.*

UNITED STATES PATENT OFFICE
CERTIFICATE OF CORRECTION

Patent No. 3,211,630                          October 12, 1965

John B. Tindall

It is hereby certified that error appears in the above numbered patent requiring correction and that the said Letters Patent should read as corrected below.

Column 2, line 32, for "1.2% nitromethane" read -- 1.2% nitroethane --; lines 52 and 56, for "distallation", each occurrence, read -- distillation --; line 66, for "78 gms." read -- 478 gms. --.

Signed and sealed this 1st day of August 1967.

(SEAL)
Attest:

Edward M. Fletcher, Jr.                      EDWARD J. BRENNER
Attesting Officer                            Commissioner of Patents